(12) United States Patent
Soken

(10) Patent No.: US 10,216,221 B2
(45) Date of Patent: Feb. 26, 2019

(54) COMPUTER CASE INCORPORATING TRANSPARENT DISPLAY

(71) Applicant: American Future Technology Corp., City of Industry, CA (US)

(72) Inventor: Bradley Soken, Glendale, CA (US)

(73) Assignee: American Future Technology Corp., City of Industry, CA (US)

( * ) Notice: Subject to any disclaimer, the term of this patent is extended or adjusted under 35 U.S.C. 154(b) by 0 days.

(21) Appl. No.: 15/852,527

(22) Filed: Dec. 22, 2017

(65) Prior Publication Data

US 2018/0196471 A1 Jul. 12, 2018

Related U.S. Application Data

(60) Provisional application No. 62/476,527, filed on Mar. 24, 2017.

(30) Foreign Application Priority Data

Dec. 27, 2016 (CN) .................... 2016 2 1453470 U
Jan. 10, 2017 (DE) .................... 20 2017 100 089 U

(51) Int. Cl.
*G06F 1/16* (2006.01)
*G06F 3/0481* (2013.01)
*G06F 1/18* (2006.01)

(52) U.S. Cl.
CPC .......... *G06F 1/1601* (2013.01); *G06F 1/1626* (2013.01); *G06F 1/1637* (2013.01); *G06F 1/1683* (2013.01); *G06F 1/18* (2013.01); *G06F 3/0481* (2013.01); *G06F 2203/04804* (2013.01)

(58) Field of Classification Search
CPC .... G06F 1/1601; G06F 1/1626; G06F 1/1637; G06F 1/1683
See application file for complete search history.

(56) References Cited

U.S. PATENT DOCUMENTS

| 5,745,340 | A | * | 4/1998 | Landau | G06F 1/1616 345/1.1 |
| 7,277,275 | B2 | * | 10/2007 | Won | G06F 1/162 248/918 |
| 8,421,362 | B2 | * | 4/2013 | Kato | G02F 1/133611 315/169.3 |
| 2005/0106917 | A1 | * | 5/2005 | Chang | H01R 13/7036 439/289 |
| 2010/0222110 | A1 | * | 9/2010 | Kim | G06F 1/1616 455/566 |
| 2010/0333006 | A1 | * | 12/2010 | Ostergard | G02B 26/005 715/768 |
| 2014/0035942 | A1 | * | 2/2014 | Yun | G09G 5/006 345/592 |
| 2014/0111448 | A1 | * | 4/2014 | Moses | G06F 1/1601 345/173 |
| 2014/0233218 | A1 | * | 8/2014 | De La Fuente Sanchez | G06F 1/1601 362/97.3 |

* cited by examiner

*Primary Examiner* — Nidhi Thaker
(74) *Attorney, Agent, or Firm* — Social IP Law Group LLP; Jonathan Pearce

(57) ABSTRACT

There is disclosed a computer enclosure incorporating a transparent display. The computer enclosure includes a panel covering at least one side of the computer enclosure, a transparent panel, making up at least a portion of the panel, the transparent panel including a display, and at least one backlight, disposed within the computer enclosure, for providing backlight to the display.

14 Claims, 10 Drawing Sheets

© 2017 American Future Technology Corp.

COMPUTER CASE INCORPORATING TRANSPARENT DISPLAY

RELATED APPLICATION INFORMATION

This patent claims priority from United States provisional patent application No. 62/476,527 entitled "Display Panel Device for Computer Housing" filed Mar. 24, 2017.

The application is also claims priority to Chinese utility model application number 201621453470.4 entitled "Display Panel Device for Computer Housing" filed Dec. 27, 2016 and to German utility model application number DE 20 2017 100 089 U1 entitled "Display Panel Device for Computer Housing" filed Jan. 10, 2017 which are both co-owned by the owner of this patent.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to electronic device enclosures and, more specifically, to a transparent display used as a portion of a panel for a computer enclosure.

Description of the Related Art

Computer cases or enclosures, particularly among computer and computer gaming enthusiasts, have increasingly become an expression of one's personality and overall interest in the communities. Avid computer gamers often spend time and money customizing the interior and exterior of their computer cases for dramatic effect or for aesthetic purposes. Though these aesthetic considerations seldom add to the performance or actual substance of a given computer, serious gamers spend sufficient time in close proximity to their computers that they view the computer to be an extension of their personality or self-expression.

Early computer enclosures were primarily functional. The main purpose was to protect the sensitive electronics from contamination by dust, hands, water, or anything that might damage or impede operation of the electronic components. A secondary purpose of computer cases is generally to enable air to flow over warmer components that require cooling to operate (e.g. cutting-edge graphics cards and central processing units). These components traditionally relied upon passive heat fins and other heat pipes to dissipate heat. Still, these fins and pipes relied upon movement of air past them to dissipate the heat. More-recently, these components generally include an active cooling element such as a dedicated fan or water cooling elements that pass water over warm components to dissipate heat. These water-cooling systems operate much like radiator cooling systems for automotive engines.

Since the early to mid 1990s, "gaming" PCs (personal computers) have become increasingly popular. These PCs are often painted in dramatic ways, including flames, emblems, or colors not typical in traditional office computers. Also, these cases can use lighting in interesting ways, such as buttons backlit in bright colors, or lighted system readouts with details regarding the operating temperatures and hard drive access visible from the exterior of enclosures. Further, one or more cutouts along one or more panels of the computer can be placed so that the interior can be viewed. Exterior observers are able to see the interior of the enclosure and the electronics present. A knowing observer might quickly determine the type and model of components within the enclosure, similar to an automotive specialist looking over an engine and noticing performance parts and being impressed. Colors may be selected or available for aspects of various components to create an overall scheme (e.g. most components are colored white or black or red).

Computer component designers have taken this one step further in recent years, dramatically advertising the make and model of components, either visibly on the component, or sometimes even with lighted effects touting a particular brand and model. High-end graphics cards, for example, often include LED lighting and are shipped with a particular color "on" (perhaps the brand-associated color for the graphics card—e.g. green for Nvidia® or red for AMD®), but including small application programs that operate on the associated computer and enable the end-user to select the color of the LED. This feature is important for users who have a particular color "scheme" in mind for their computer, but want a particular component. These users do not want to ruin their overall design just by buying one desired, new component of a "wrong" color.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
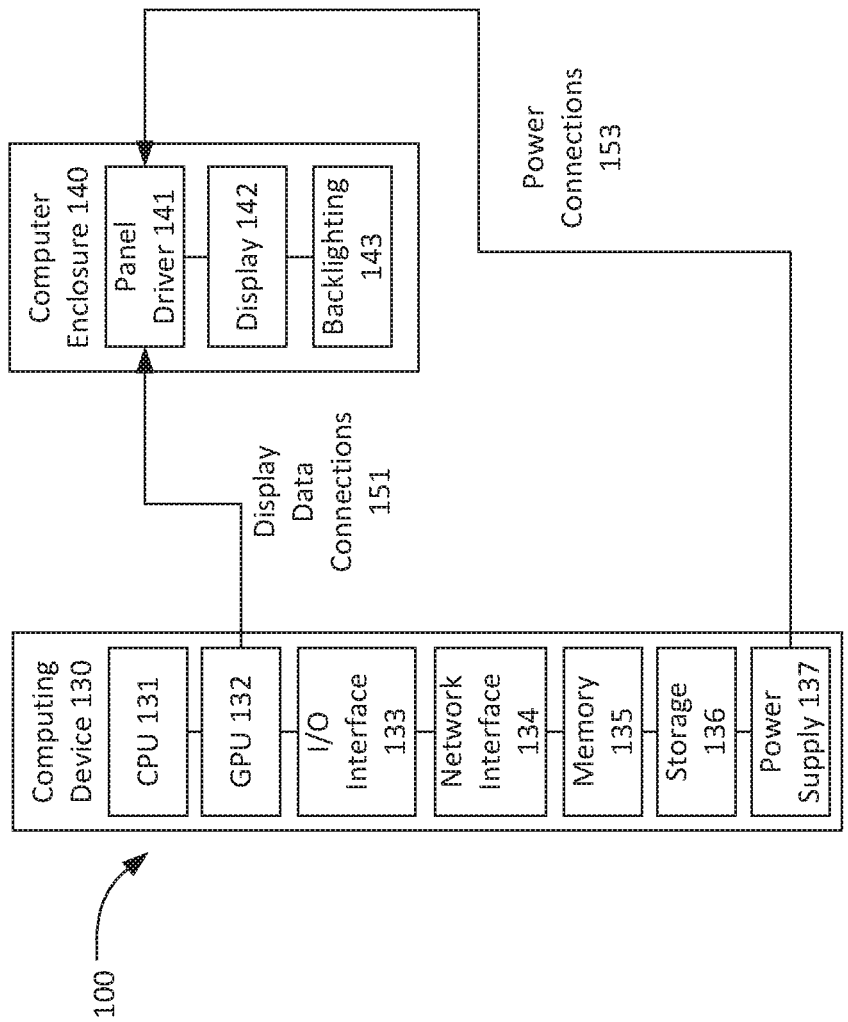
FIG. 1 is a structural diagram of a computing device and computer enclosure.

Turning first to FIG. 1, a structural diagram of a computer enclosure system 100 is shown. The system 100 includes a computing device 130 and a computer enclosure 140.

The computing device 130 includes a central processing unit (CPU) 131, a graphics processing unit (GPU) 132, an input-output (I/O) interface 133, a network interface 134, memory 135, storage 136, and a power supply 137.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or a system-on-a-chip (SOCs). The CPU 131 may be specialized, designed for operations upon visual, graphical, or audio data, or general purpose. Though identified as a central processing unit, the CPU 131 may in fact be multiple processors, for example multi-core processors, or a series of processors joined by a bus to increase the overall throughput or capabilities of the CPU 131.

The CPU 131 may run software that enables a user to select a still image, a moving image (e.g. a movie or a .gif file), a logo, a live stream, a stream of an on-going game or service (e.g. twitch.tv or YouTube), a feed from a camera, either local or remote, information about the computing device 130, or other imagery to be displayed on the display 142 (see below). The software may operate as a small application, potentially that starts when a user boots up his or her computing device 130, such that a default image is displayed. Events or actions on the computing device 130 (e.g. launching a game or particular application, beginning a video stream) or the like may cause the software operating on the CPU 131 to automatically alter the image displayed on the display 142.

For example, if a user begins playing a game (or playing a particular game) on the computing device 130, then the CPU may instruct the display 142 to begin displaying an aspect of that game, or an associated live stream, a capture of a camera, information about the computing device 130 (e.g. CPU temperature, GPU temperature, framerates, etc.), or an animation. Alternatively, the image may be fixed or a loop of a moving image that repeats once or indefinitely until it is changed by the user or disabled.

The GPU 132 is a specialized processor including specialized instruction sets for operating upon video-related and computer-graphics related data. The function of the GPU 132 may overlap with the CPU 131. However, the GPU 132 is distinct in that it is a specialized processor that is designed for the purpose of processing visual data, particularly vector and shading, and performs faster memory operations and access, along with performing specialized lighting operations. The instruction sets and memory in the GPU 132 are specifically designed for operation upon graphical data. In this way, the GPU 132 may be especially suited to operation upon image data or efficient performance of complex mathematical operations Like the CPU 131, the GPU 132 is shown as a single graphics processing unit, but may actually be one or more graphics processing units in a so-called multi-core format or linked by a bus or other connection that may together be applied to a single set of or to multiple processing operations.

The GPU 132 (or in some cases the CPU 131) may operate to render the associated content for display on the display 142. In particular, if portions of a game are shown, or a complex animation, or a video stream, the GPU 132 may operate, as directed by software operating on the CPU 131 to render the associated content for display on the display 142. The panel driver 141 (discussed below) is used as well.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

Power supply 137 is a typical computer power supply. The power supply converts alternating current (AC) into direct current (DC) power for use by the computer components. Power supplies typically have an output wattage associated with them. In some cases, particular wattages may be required for certain components to operate (e.g. GPUs that require a minimum of 160 watts of DC power in addition to wattage used by the remainder of the computer).

The computer enclosure 140 includes a panel driver 141, a display 142, and backlighting 143.

The panel driver 141 is an electronic component that accepts power from the power supply via power connections 153 and display data from the GPU 132 (or in some cases the CPU 131) via the display data connections 151 and generates visual images on the associated display 142. In its simplest form, the panel driver 141 converts visual data and power into individual pixel information suitable to turn off or on individual pixels (or sets of pixels) on the display 142 to cause images to appear there. In most cases, the panel driver 141 is integrated, physically, into the display itself or into the display's casing. However, the components may be oriented separately from one another.

The display 142 is an LCD (or other technology) display. For example, OLED, QLED, and other technologies may be employed as well. One benefit of OLED and QLED is that they are self-illuminating. In situations in which such displays are used, backlighting 143 may not be required or may be of less high-quality. The display may be black-and-white such that pixels "on" appear in black and pixels "off" appears translucent (or lighter, when backlit). Alternatively, the display may be color. The display may be a relatively low resolution (e.g. 640×480 pixels) or may be extremely high resolution (e.g. so-called "4K" screen). Given the nature of the content typically displayed, high resolution is not a necessity. But availability of a higher resolution may provide a more aesthetic appearance. In some cases, the display may be of sufficient quality that it could, theoretically, serve as a second monitor.

Preferably, the display 142 is a transparent or translucent (the terms are used interchangeably herein, but the meaning being that at least light behind the display 142 may be seen in addition, potentially, to other details) LCD without inherent backlighting. The LCD does not have LEDs, CFLs or other backlighting immediately adjacent to (e.g. behind) the LCD. Therefore, without some external backlighting, images shown on the LCD may not be visible to an external viewer. As used herein any "display" does not incorporate any backlighting.

The display 142 may be, for example, manufactured in such a way that it is encased within a solid, transparent or translucent, substance. The display 142 may be encased within glass, acrylic, polyurethane, polyethylene, and or other, similar substances. Alternatively, the display 142 may be sandwiched between two (or more) layers of any of the above. Further, the display 142 may be adhered to or otherwise affixed to a solid, transparent or translucent, substance with the display mounted on the interior of the case, and the solid material on the exterior. This entire sandwich or film on solid substrate may be considered the display 142. However, the display 142 does not include any integrated backlighting. The display 142 may be black and white only, so as to increase contrast with the computer enclosure 140 interior. In other situations, the display 142 may be a full-color display of millions of colors.

The backlighting 143 is lighting, elsewhere within the computer enclosure 140 that illuminates, indirectly, the display 142. The backlighting 143 may be, for example, a single white light mounted somewhere within the computer enclosure 140. The interior of the computer enclosure 140 may be painted or include components that are of a light color, e.g. white, light grey, yellow, such that illumination contrasts well with a black and white display 142. The backlighting 143 may include LED (or other) bias lights fixed to the interior of a panel surrounding the transparent display 142 that emit light into the interior of the computer enclosure that is reflected back toward the transparent display by the light color of the interior.

In cases of OLED or QLED displays and the like with inherent illumination, the interior of the computer enclosure 140 may be intentionally of a dark color, e.g. black, dark grey, blue, to provide contrast against self-illuminated pixels. The backlighting 143 may be a series of lights, like bias lights arranged around the interior of the computer enclosure (e.g. encircling a panel holding the display 142. Any number of arrangements of associated backlighting 143 within the computer enclosure 140 may be envisioned.

Figure 2:
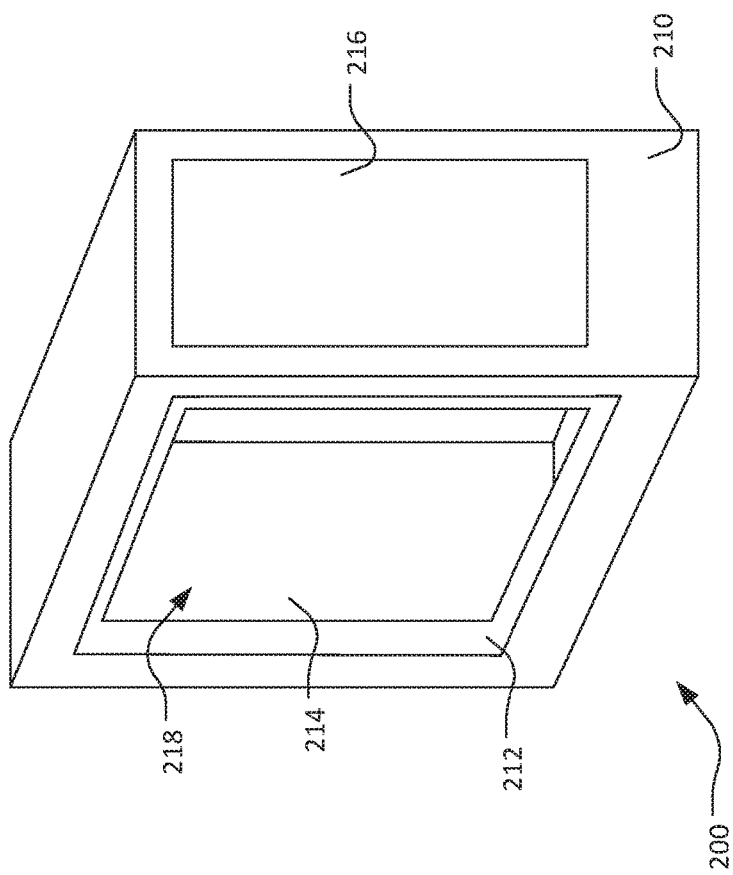
FIG. 2 is a computer enclosure including a transparent display.

FIG. 2 is a computer enclosure 200 including a transparent display 214. The computer enclosure 200 may be a typical enclosure including a front panel 210 with cutouts 216 for computer components (e.g. disk drives, USB ports, fans, etc.). However, this computer enclosure 200 includes at least one panel 212 including a transparent display 214 that, when off, enables one to view the interior 218 of the enclosure.

Although shown as a side panel 212, the panel 212 may be on the top, the front, the back, underneath, multiple sides, or only a portion of any of the above for a computer enclosure 200. It's placement and location or size are not particularly relevant to its overall function and design. In addition, though discussed as a transparent display 214 for a computer enclosure 200, the transparent display may be employed in other contexts such as laptops, hand-held computers, televisions, tablets, speakers, remote controls, and other electronic devices and components.

Unless otherwise noted herein, element numbers bearing the same name and the same last two significant digits, but a different first significant digit, are intended to refer to the same element from a preceding figure.

Figure 3:
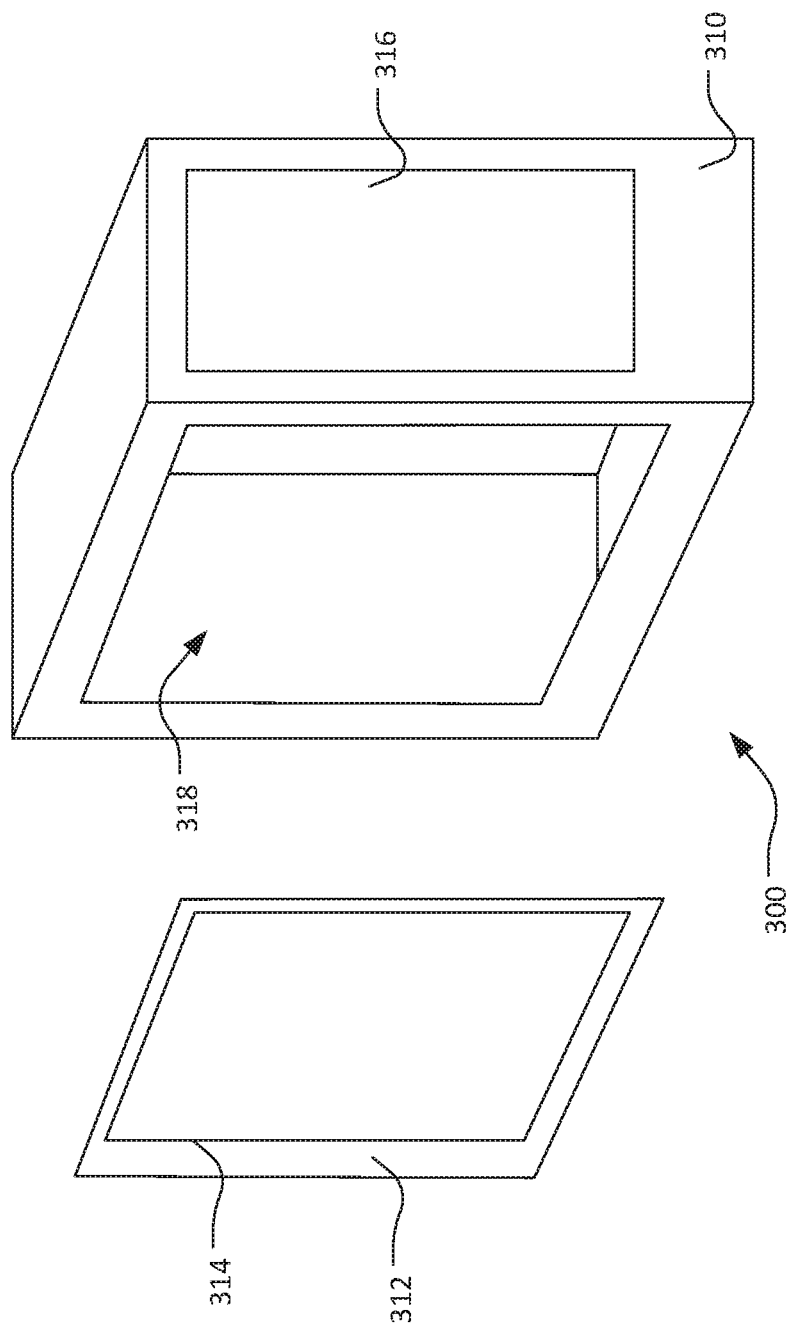
FIG. 3 is a computer enclosure with an associated panel including a transparent display removed.

FIG. 3 is a computer enclosure 300 with an associated panel 312 including a transparent display 314 removed from the enclosure 300. The same front panel 310 and cutouts 316 are shown. The interior 318 of the enclosure is now fully-visible. In the interior 318 may be the backlighting 143 discussed above. Here, the panel 312 including the transparent display 314 is removed from the computer enclosure to demonstrate that the panel 312 may be removed. In some cases, the panel 312 may make up the entirety of a side (or multiple sides) of a computer enclosure 300. In such cases, they may also be removed. Screws, clips, a press fit, a friction fit, and other similar systems may be employed to keep panels, like panel 312, affixed to the remainder of the computer enclosure 400.

Figure 4:
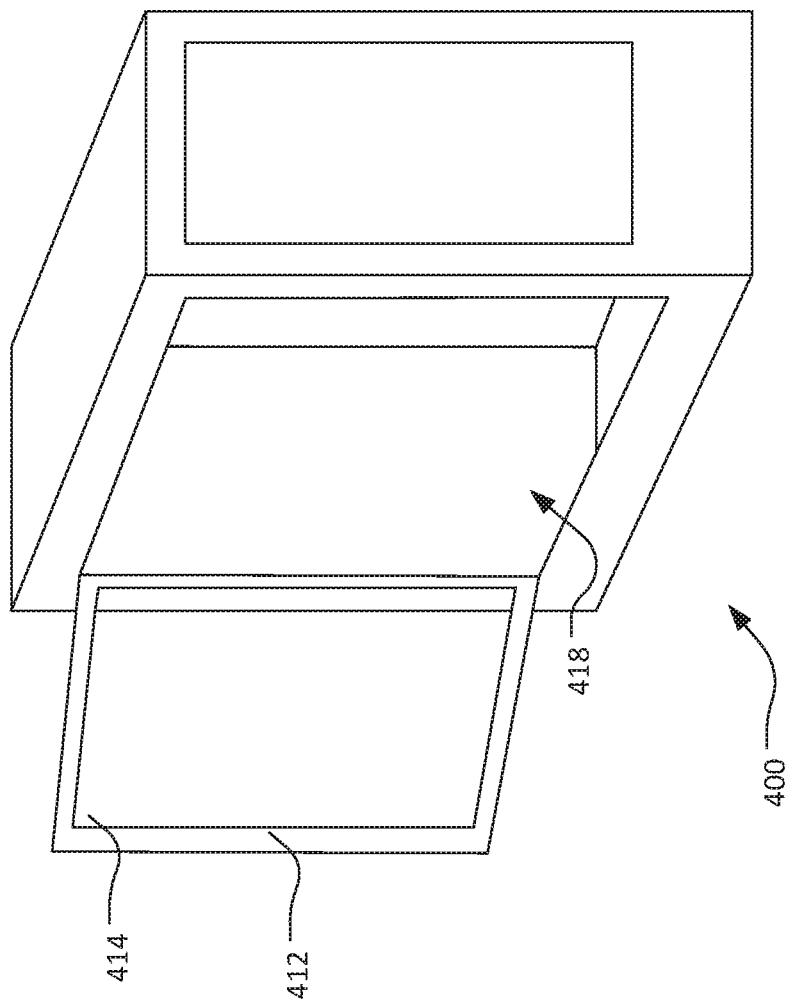
FIG. 4 is a computer enclosure with an associated panel including a transparent display opened on a hinge.

FIG. 4 is a computer enclosure 400 with an associated panel 412 including a transparent display 414 opened on a hinge. In FIG. 4, the interior 418 of the computer enclosure 400 may be seen because the panel 412 has been opened on at least one hinge. Hinges for these types of computer panels enable the panels 412 to be opened without removing them physically from the computer enclosure 400.

Figure 5:
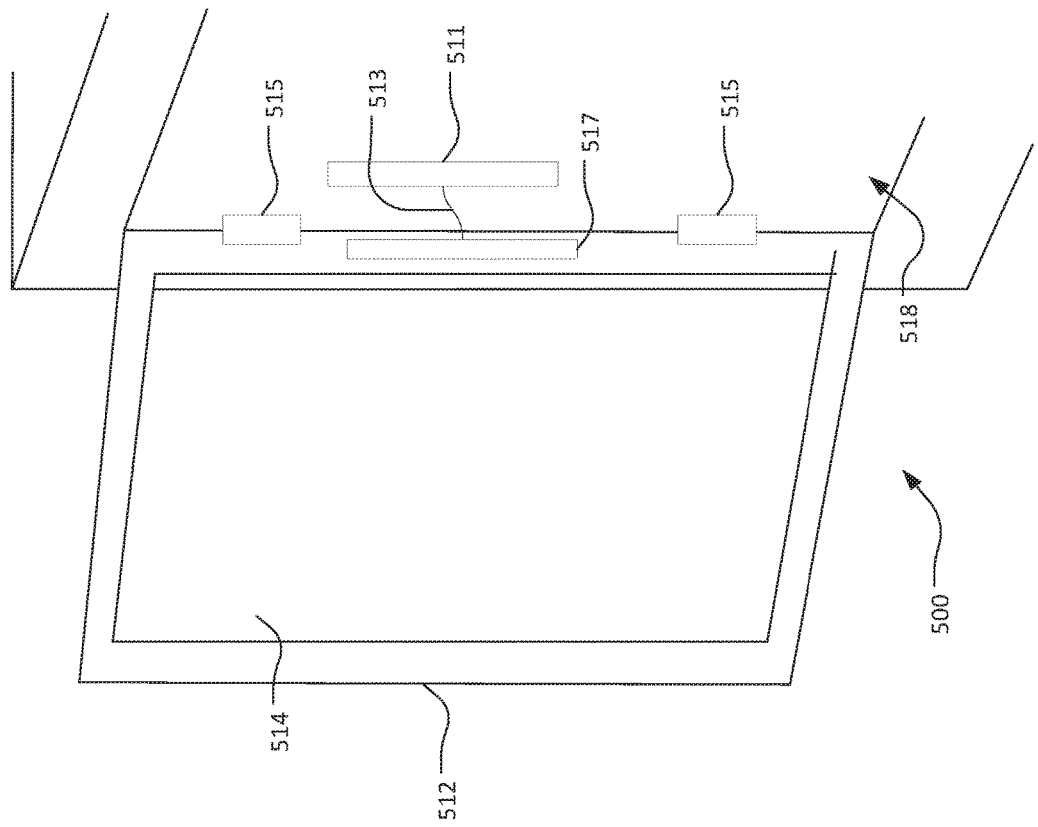
FIG. 5 is a close-up view of a computer enclosure with an associated panel including a transparent display opened on a hinge.

FIG. 5 is a close-up view of a computer enclosure 500 with an associated panel 512 including a transparent display 514 opened on one or more hinges 515. Any number of hinges 515, from one or more, may be used. The hinges 515 join the panel 512 to the rest of the computer enclosure 500.

The computer enclosure 500 also includes a terminator 511 that may receive both power and visual data for display on the display 514 from a power supply and graphics computing unit (see FIG. 1). In some cases, the power and visual data may be integrated into a single set of wires. The terminator 511 integrates with electrical connections 513 for passing the power and visual data to a panel driver 517. The panel driver 517 is shown as affixed to the panel 512, but may or may not be visible to an end-user or may otherwise be integrated into the display 514. The electrical connections 513 as shown are a series of wires that provide the power and visual data to the panel driver 517 so that visual data may appear on the display 514. The interior 518 may be backlit, as discussed above.

Figure 6:
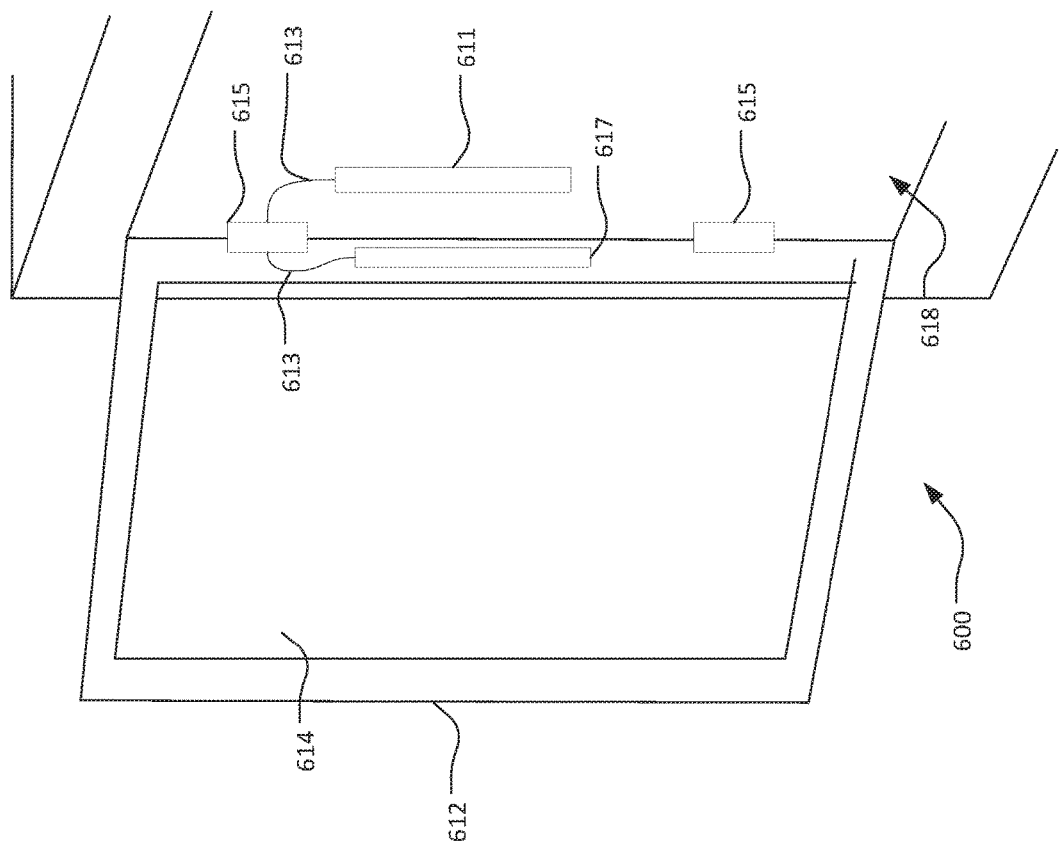
FIG. 6 is a close-up view of a computer enclosure with an associated panel including a transparent display with a hinge that incorporates electrical connectors joining the panel to the computer enclosure.

FIG. 6 is a close-up view of a computer enclosure 600 with an associated panel 612 including a transparent display 614 with a hinge 615 that incorporates electrical connectors coupling the panel 612 to the computer enclosure 600. The panel 612, the transparent display 614, the electrical connections 613, the terminator 611, the panel driver 617 are all similar to those discussed above. They will not be discussed herein again.

However, the hinge 615 (top, in this case) is a specially-designed hinge that incorporates a series of electrical connectors that are designed in such a way that they make contact when the computer enclosure 600 is joined to the panel 612 and closed. Once closed, the electrical connectors within the hinge 515 make electrical contact and can conduct electricity, including the power and visual data being transmitted between the terminator 611 and the panel driver 617. As used herein, "closed" means that the computer enclosure is complete and in a form where the panel is mounted such that it is intended for day-to-day operation of the computer (e.g. not off or lying next to it). In the case of hinged computer enclosures, "closed" means that the hinge is fully-collapsed, and the panel is in place for normal day-to-day operation of the computer (e.g. not open to the air).

The hinge 615 is shown as a single hinge 615 near the top of one side of the panel 614, but the hinge 615 may be a single, large hinge. The terminator 611 and panel driver 617 are shown separate from the hinge 615, but may be fully or partially integrated with a hinge such that electrical components have a single termination point on both sides of the hinge 615.

Alternatively, the hinge 615 may be a set of components mounted along the edge of the panel 614 and a corresponding point on the computer enclosure 600 where the panel 614 meets. The counterpart connectors may be integrated into two terminators on either side of the connection such that, when the panel 614 is affixed to the computer enclosure 600 and the panel is closed, the electrical connection between the panel driver 617 and the terminator 611 is created.

Figure 7:
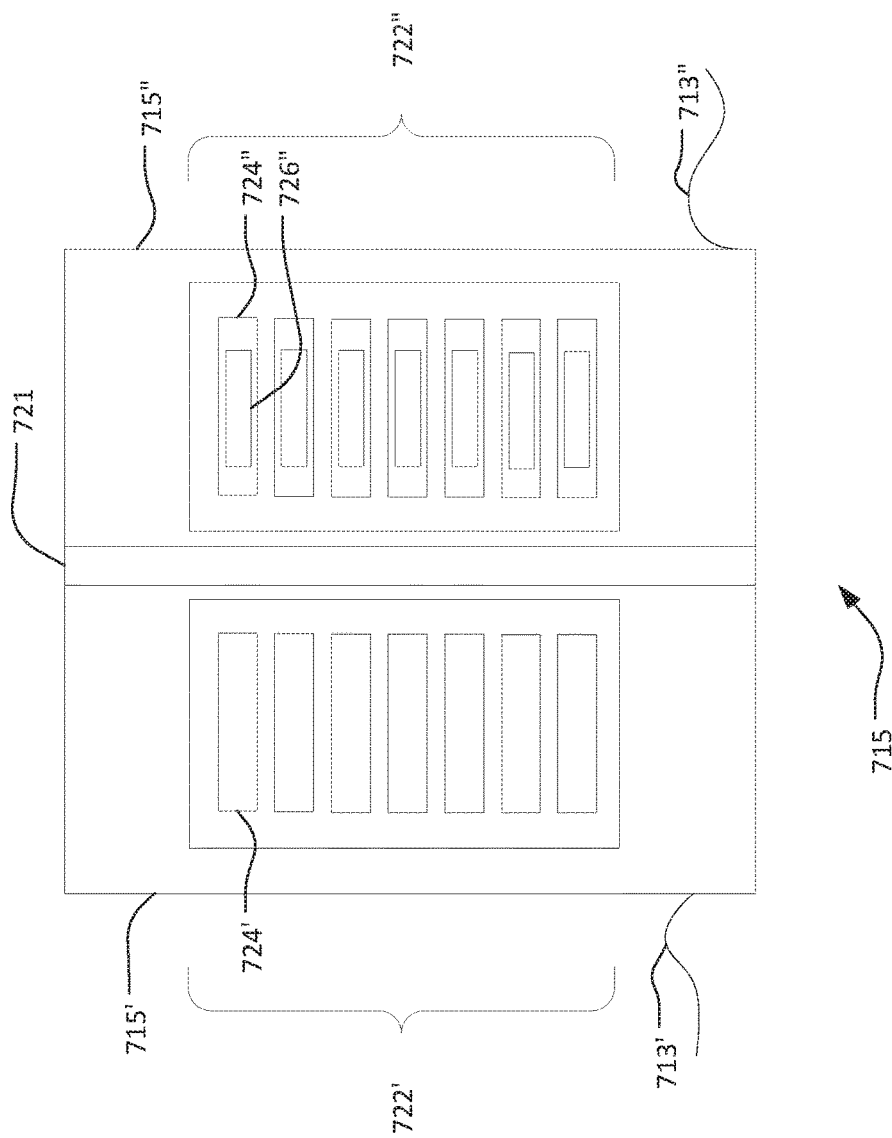
FIG. 7 is a top-down view of a hinge incorporating electrical connectors.

FIG. 7 is a top-down view of a hinge 715 incorporating electrical connectors. The hinge 715 includes a female side 715' and a male side 715". The female side 715' includes an electrical junction 722' with a series of electrical connectors 724'. The electrical connectors 724' may be (and are shown as) a series of electrically conductive plates of small, exposed, electrically-conductive elements (e.g. flattened copper or steel).

The counterpart male side 715" includes a counterpart electrical junction 722" with male electrical connectors 724" that are very much like the electrical connectors 724', but also include elements 726" extending outward. These elements may be other pieces of conductive material soldered or welded to the electrical connectors 724", thereby, extending outward from those electrical connectors 724" in a raised manner. Alternatively, the electrical connectors 724" may be spring-loaded such that they extend outward.

The outward extension of the male side 715" is sufficient such that, when the hinge 715 is folded along its centerline 721, such that the electrical junction 722' and 722" are placed flush in contact with one another, an electrical connection is made because the portions of the male side 715" extend outward to contact those of the female side 724'. Electrical connection 713' and 713" pass electrical signals and power to the hinge 715 on either side.

As pointed out above, the hinge 715 may not be a hinge at all. In such cases, one can envision simply removing the centerline 721, thereby converting the hinge 715 into two electrically-conductive counterpart components. When these two components are aligned within the computer enclosure when the panel is closed, electricity may pass between the two counterpart components to enable the transparent display to operate without the unsightly electrical cables being connected in a visible way when the computer enclosure is closed.

Figure 8:
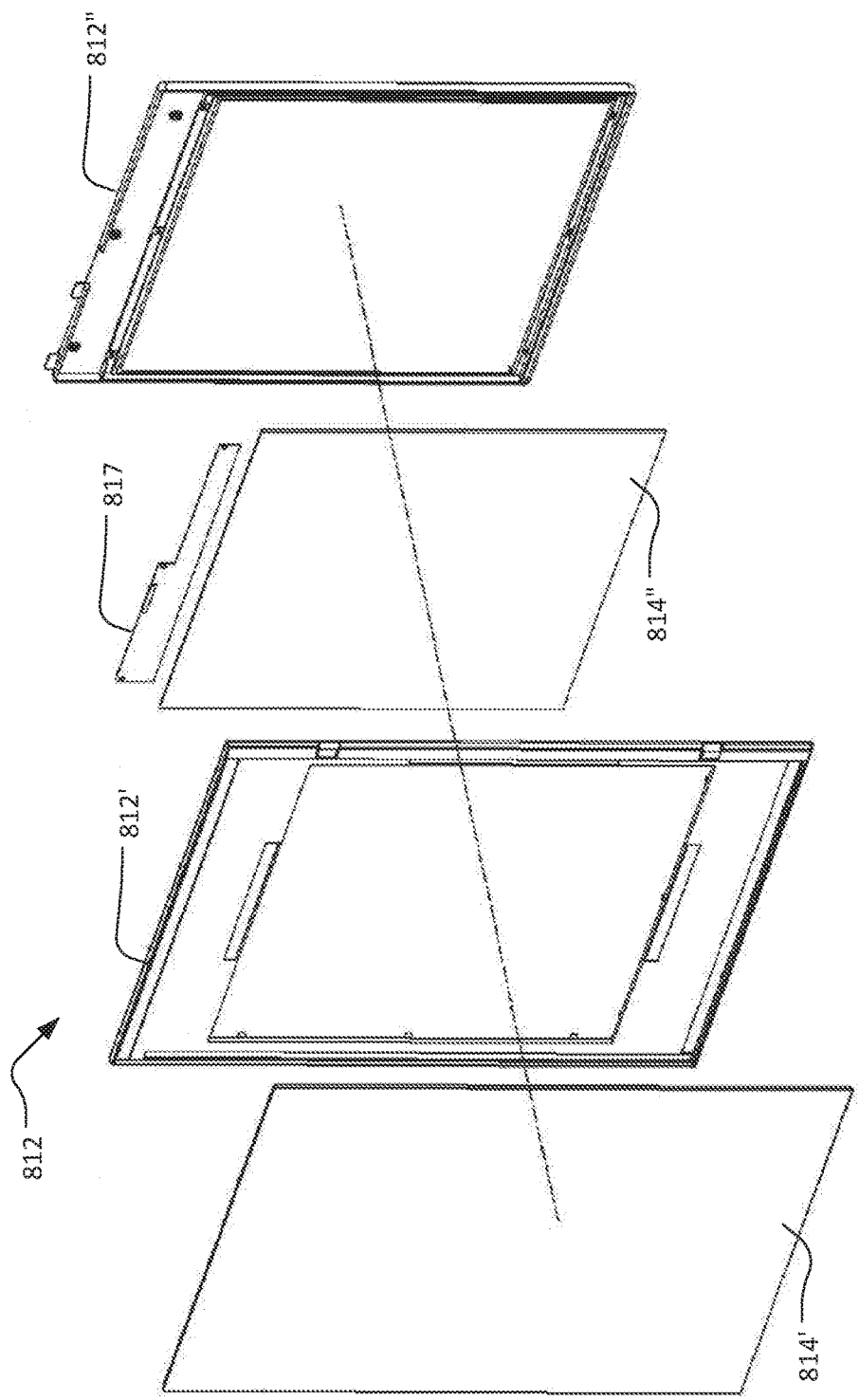
FIG. 8 is an exploded view of an example panel including a transparent display.

FIG. 8 is an exploded view of an example panel 812 including a transparent display. The panel 812 includes an exterior translucent material 814', an exterior panel body 812', interior translucent material 814" (which may include the actual LCD display), a panel driver 817, and an interior panel body 812". The exterior translucent material 814' is discussed above as potentially being glass, acrylic, polyethylene, polyurethane, or other, similar material. The exterior panel body 812' is preferably metal, such as aluminum or steel, or plastic, and generally of the same material as the rest of the computer enclosure. The exterior panel body 812' may also provide a covering or internal molding around the interior translucent material 814" and the panel driver 817.

The panel driver 817 and interior translucent material 814" may be the same material as those described above, or may be different (e.g. exterior glass, interior acrylic). The interior panel body 812" affixes to the exterior panel body 812' while enclosing the other components. The panel 812 may be joined using welding, soldering, rivets, screws, clips, glue or other systems for affixing the components together. Preferably, they are joined in such a way that they do not easily come apart.

Description of Processes

Figure 9:
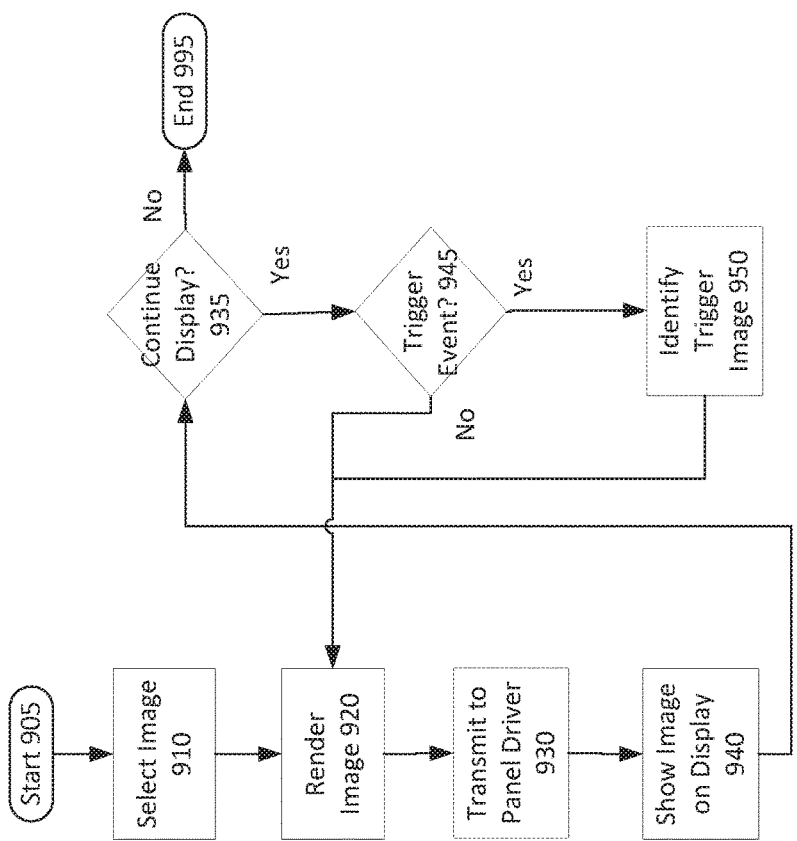
FIG. 9 is a flowchart of a process for display of images on a transparent display.

Turning to FIG. 9 a flowchart of a process for display of images on a transparent display is shown. The flowchart has a start 905 and an end 995, but may continue indefinitely, so long as an image is displayed. The process may restart upon activation of an associated application for selecting or changing an image displayed on the associated transparent display.

First, following the start 905, an image is selected by a user 910. As discussed above, a user may select a particular fixed image, or an alternating image, a movie, an animation, a .gif or virtually anything that is capable of being displayed on any conventional computer display. There may be an associated application that enables this display, and allows a user to select an associated image (or images, because multiple images or animations may be displayed simultaneously) Likewise, the application may incorporate or provide access to a group of previously-created animations, movies, images or the like. Or, an image may be an image created or selected by a user.

In these images, a particular color (e.g. white) may effectively be "transparent." In such a way, a user may cover the entirety of the transparent display, such that none of the components inside may be seen. However, if a user desires to display those components, some portions of the associated image that are selected may be transparent, thereby allowing light to pass through so that one may see the associated components. The "image" may in fact be multiple images including widgets that provide dynamic sources of information about the computer or other devices.

Once an image is selected at 910, it is rendered at 920. This rendering process may involve the GPU 132, discussed above. The CPU may perform calculations (e.g. CPU usage or temperature of the CPU) that are used as a part of the image displayed. The GPU 132 may be required to perform three-dimensional or motion-picture rendering for the image to be displayed.

At 930, the GPU transmits the rendered image to the panel driver 141. The panel driver 141 receives data pertaining to the rendered image and converts it into a form suitable for entry into the frame buffer and, eventually, for display as actual pixels on the panel 142.

Thereafter, the image is shown on the display at 940. At this point, the pixels activate and deactivate on the panel 142 according to the data provided by the panel driver 141. As indicated above, the display 142 may be black and white or may be color.

The image displayed may be fixed (e.g. a picture) or may be in motion (e.g. a movie) or may be an animation that runs for a pre-determined time. Then, the image may loop. If a fixed image is chosen, it may be a single image or may be a folder or group of folders with a specific order of images shown in succession or a random image selected from a group. Regardless, whatever animation, image, group of images, movie, or the like is selected, if the associated application has instructed the computer to display the image or images on a continuous loop, that is determined at 935. If the image (or images) is not to continue being displayed ("no" at 935), then the process ends.

If the image is to continue being displayed ("yes" at 935), then a determination is made whether there is a trigger event at 945. A trigger event is an event, predetermined by a user and identified in the associated image selection software, that causes a different image to be displayed. A trigger event may be as simple as the CPU or GPU temperature rising by 0.1%. In that case, an associated dynamic readout of the CPU or GPU temperature must be updated. This is a triggering event 945 that may cause the new image to be rendered.

Alternatively, a triggering event may be complex, such as an instant message, an in-game message, the launching of a particular piece of software or a game, the start of a streaming process, a particular time, receipt of a particular piece of data from the Internet or an email, or virtually any other type of information, data or event that can be automated or upon which automation may be based.

If no triggering event is received ("no" at 945), then the same image previously selected continues to be rendered at 920, transmitted to the panel driver at 930, and shown on the display at 940.

If a triggering event is received ("yes" at 945), then the trigger image is identified at 950. This image may have been previously determined by a user of the associated software. For example, upon the launch of a particular game (the triggering event), the software may be instructed to display nothing so as to stop utilization of the GPU for non-game tasks. In this case, the trigger image would be blank. Alternatively, upon launch of a streaming session for a game (e.g. broadcasting a playthrough with commentary and/or video to the web), this may be a triggering event, and the trigger image may be a viewer count so that the individual can know how many viewers are watching his or her playthrough of that game. Upon receipt of an email (the triggering event), the display may be updated to provide a pre-view of that email's content. More simply, animations may change or a particular image (e.g. logo) may be desirable while playing a particular game or while not operating any significant software. For example, a CPU at idle detection (e.g. utilization less than 10%—a triggering event) may result in a much more complex animation being displayed. Virtually any triggering event can cause something to update on the associated display. These triggering events are defined using software and may be selected by an operator of an associated computer.

The newly-identified image at 950 is passed to the GPU 132 for rendering at 920 and so on as discussed above.

Figure 10:
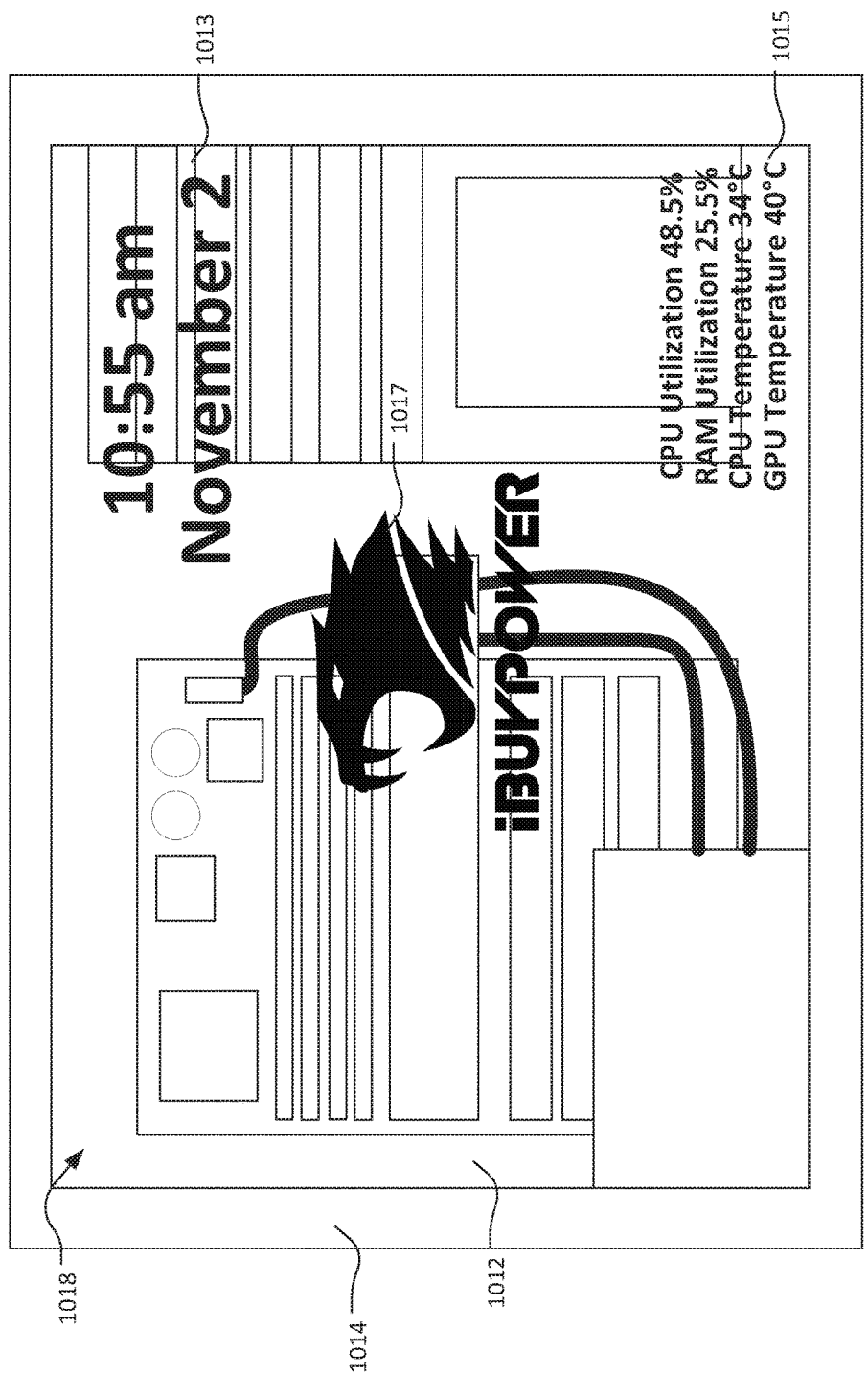
FIG. 10 is an example of an image shown on a transparent display.

FIG. 10 is an example of an image shown on a transparent display 1012. The transparent display 1012 is built into the panel 1014 and allows viewing of the interior 1018 of the enclosure. As shown in FIG. 10, the interior 1018 includes various computer components (e.g. the CPU 131, the GPU 132, etc.—not individually labelled).

However, in addition to those components shown in the interior 1018, a series of images 1013, 1015, and 1017 may be seen displayed on the display 1012. First, the time and date are shown as one image 1013 on the upper, right-hand corner of the display 1012. As should be expected of any such clock, the clock may be animated such that the date and time update as one would expect. In this case, the triggering event would be a change in the time and/or date which would cause the image 1013 to update.

Similarly, image 1015 is a set of metrics related to the computer. These metrics may be obtained from the motherboard bios, CPU itself, and/or the operating system of the associated computer. As one would expect, these metrics also update based upon triggering events (e.g. as they change).

Image 1017 is a logo associated with a computer manufacturer. This logo may be fixed, may change periodically (e.g. rotate a series of logos), or may be animated (e.g. such that the image appears to "roar" or "blink" or "attack"). This image 1017 may have trigger events associated with it such that it changes colors or moves around the display 142 as events happen.

Finally, other images may be associated with the display. Animations such as simulated "smoke" rising from the bottom of the display 142, or a lava-lamp-like effect may appear to float from the bottom of the display 142. Flashes of data, rain, geometric animations, film clips from movies, virtually anything may be shown on the display 142 and may be associated with a triggering event.

Though not shown specifically, the interior 1018 may be primarily white in color so that the images 1013, 1015, and 1017 may be more-easily seen in contrast to the white interior 1018. As discussed above, backlighting is typically also employed.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semiclosed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computer enclosure comprising:
a panel forming at least a part of one side of the computer enclosure, the panel having an opening;
a transparent panel, forming at least a portion of the panel, the transparent panel comprising a transparent display,
panel driver circuitry, disposed within the computer enclosure, but not adjacent to the panel, for causing images on the transparent display to change as directed by a computer;
electrical connectors, disposed within a hinge, comprising:
a set of exposed conductive plates, each of the conductive plates being one of a power supply connector for providing power to the transparent display and a display panel connector for transmitting data to be presented on the transparent display, and
a set of conductive connectors, each of the set of conductive connectors placed so as to contact one of the set of exposed conductive plates when the panel is affixed to the computer enclosure and when the panel is closed;
wherein the electrical connectors join the transparent display to a power supply and to the panel driver circuitry thereby linking the transparent panel to the computer; and
at least one backlight, disposed within the computer enclosure, for providing backlight to the display.

2. The computer enclosure of claim 1 wherein the display lacks an integrated backlight within the transparent panel or the display.

3. The computer enclosure of claim 1 wherein the set of conductive connectors are spring-loaded so as to be compressed into electrical contact with the set of exposed conductive plates.

4. The computer enclosure of claim 1 wherein the transparent panel is a transparent liquid crystal display encased within or affixed to a transparent structural material.

5. The computer enclosure of claim 4 wherein the transparent structural material is at least one of: glass, acrylic, polyethylene, and polyurethane.

6. The computer enclosure of claim 1 wherein at least some of the components of a computer disposed within the computer enclosure are of a color, when backlit, to serve as contrast against which information shown on the display may be seen by an external viewer.

7. The computer enclosure of claim 6 wherein the color is at least one of white, light grey, or yellow.

8. A panel for a computer enclosure comprising: a transparent panel, mounted in an opening of the panel, the transparent panel comprising a display; panel driver circuitry, disposed behind the display, for causing images on the display to change as directed by a computer; electrical connectors, disposed within a hinge, comprising: a set of exposed conductive plates, each of the conductive plates being one of a power supply connector for providing power to the display and a display panel connector for transmitting data to be presented on the display, and a set of conductive connectors, each of the set of conductive connectors placed so as to contact one of the set of exposed conductive plates when the transparent panel is affixed to the computer enclosure and when the transparent panel is closed; wherein the electrical connectors join the display to a power supply and to the panel driver circuitry thereby linking the transparent panel to the computer; and at least one backlight, disposed behind, but not abutting the transparent panel, for providing backlight to the display.

9. The panel of claim 8 wherein the display lacks an integrated backlight within the transparent panel or the display.

10. The panel of claim 8 wherein the set of conductive connectors are spring-loaded so as to be compressed into contact with the set of exposed conductive plates to thereby complete an electrically-conductive connection between the panel driver and the display.

11. The panel of claim 8 wherein the transparent panel is a transparent liquid crystal display encased within or affixed to a transparent structural material.

12. The panel of claim 11 wherein the transparent structural material is at least one of: glass, acrylic, polyethylene, and polyurethane.

13. The panel of claim 8 wherein at least some of the components of a computer disposed behind the panel are of a color selected from the group of white, light grey, or yellow.

14. A panel for a computer enclosure comprising: a transparent panel for the computer enclosure comprising a display taking up at least a portion of the transparent panel; electrical connectors, disposed within a hinge, comprising: a set of exposed conductive plates, each of the conductive plates being one of a power supply connector for providing power to the display and a display panel connector for transmitting data to be presented on the display, and a set of conductive connectors, each of the set of conductive connectors placed so as to contact one of the set of exposed conductive plates when the transparent panel is affixed to the computer enclosure and when the transparent panel is closed; wherein the electrical connectors join the display to a power supply and to panel driver circuitry thereby linking the transparent panel to a computer; and at least one backlight, disposed behind the transparent panel, for providing backlight to the display.

* * * * *